(12) United States Patent
Newton et al.

(10) Patent No.: US 8,828,537 B2
(45) Date of Patent: *Sep. 9, 2014

(54) LOW PROFILE REINFORCING TAPE

(75) Inventors: Mark J. Newton, Perkinsfield (CA); Mark W. Tucker, Waubaushere (CA)

(73) Assignee: Saint-Gobain ADFORS Canada, Ltd., Grand Island, NY (US)

( * ) Notice: Subject to any disclaimer, the term of this patent is extended or adjusted under 35 U.S.C. 154(b) by 646 days.

This patent is subject to a terminal disclaimer.

(21) Appl. No.: 12/339,715

(22) Filed: Dec. 19, 2008

(65) Prior Publication Data

US 2009/0094922 A1 Apr. 16, 2009

Related U.S. Application Data

(63) Continuation of application No. 11/084,578, filed on Mar. 18, 2005, now Pat. No. 7,482,291.

(51) Int. Cl.
*B32B 27/12* (2006.01)
*B32B 3/00* (2006.01)
*B32B 5/02* (2006.01)
*B32B 7/12* (2006.01)
*B32B 9/00* (2006.01)
*B32B 33/00* (2006.01)
*C09J 7/04* (2006.01)
*E04F 13/04* (2006.01)

(52) U.S. Cl.
CPC ........ *E04F 13/042* (2013.01); *C09J 2400/263* (2013.01); *C09J 7/041* (2013.01); *C09J 7/04* (2013.01); *E04F 13/04* (2013.01); *C09J 2201/134* (2013.01)

USPC ............. 428/343; 428/40.1; 428/61; 52/417; 442/149

(58) Field of Classification Search
None
See application file for complete search history.

(56) References Cited

U.S. PATENT DOCUMENTS 4,045,609 A * 8/1977 Hart .............................. 442/227
4,273,600 A * 6/1981 Luke ............................. 156/180

(Continued)

FOREIGN PATENT DOCUMENTS

EP 0 477 138 A1 9/1991
EP 0 477 138 B1 9/1991

(Continued)

OTHER PUBLICATIONS

Fuijii et al., JP 11-335945, Glass Cloth for Printed Circuit Board and Laminated Sheet Using the Same (Machine Translation), Jul. 12, 1999.*

*Primary Examiner* — Callie Shosho
*Assistant Examiner* — Cheng Huang
(74) *Attorney, Agent, or Firm* — Abel Law Group, LLP; Robert N. Young

(57) ABSTRACT

A reinforcing tape for imbedding in a joint compound, has reinforcing yarns defining openings for passage of the joint compound, wherein; the openings are bounded by the yarns; the yarns are provided with one or more coatings adding tensile strength and resistance to pull out of the yarns from the joint compound.

8 Claims, 2 Drawing Sheets

(56) References Cited

U.S. PATENT DOCUMENTS

| | | |
|---|---|---|
| 4,303,724 A | 12/1981 | Sergeant et al. |
| 5,662,990 A | 9/1997 | Scari et al. |
| 5,752,550 A | 5/1998 | Scari et al. |
| 5,792,713 A * | 8/1998 | Scari et al. .................. 442/189 |
| 5,807,793 A | 9/1998 | Scari et al. |
| 5,879,095 A * | 3/1999 | Gueret .......................... 401/172 |
| 6,020,065 A * | 2/2000 | Girgis et al. ................. 428/378 |
| 6,058,980 A | 5/2000 | Scari et al. |
| 6,065,506 A | 5/2000 | Scari et al. |
| 6,325,110 B1 | 12/2001 | Scari et al. |
| 7,141,284 B2 | 11/2006 | Newton et al. |
| 7,435,694 B2 | 10/2008 | Kajander |
| 2004/0185734 A1 | 9/2004 | Gray et al. |
| 2004/0200564 A1 * | 10/2004 | Kinsey et al. ................ 156/230 |

FOREIGN PATENT DOCUMENTS

| | | |
|---|---|---|
| EP | 0 477 139 A1 | 9/1991 |
| EP | 0 477 139 B1 | 4/1996 |
| EP | 0 584 429 B1 | 6/1997 |
| EP | 0 838 977 A1 | 4/1998 |
| EP | 0 894 881 A1 | 2/1999 |
| EP | 0 719 353 B1 | 6/1999 |
| EP | 0 820 540 B1 | 4/2000 |
| EP | 1 043 433 A1 | 10/2000 |
| WO | WO 96/02692 | 2/1996 |
| WO | WO 97/29230 | 8/1997 |

* cited by examiner

LOW PROFILE REINFORCING TAPE

CROSS REFERENCE TO RELATED APPLICATION

The present application is a continuation of U.S. application Ser. No. 11/084,578, filed Mar. 18, 2005 now U.S. Pat. No. 7,482,291, issued Jan. 27, 2009. This application relates to U.S. application Ser. No. 10/102,061, filed Mar. 20, 2002, now U.S. Pat. No. 7,141,284, issued Nov. 28, 2006.

FIELD OF THE INVENTION

The invention relates to a reinforcing tape, and particularly, a reinforcing tape for imbedding in a joint compound to form a finished wallboard joint.

BACKGROUND

Wallboard consists of panel-like sections of large surface area, particularly, gypsum board or drywall, which are installed at a construction site to form interior walls and ceilings of a building. Open wallboard seams are formed between abutting sections of the wallboard that meet side-by-side or that meet at inside corners. The seams are covered and hidden by constructing finished wallboard joints. Additional seams can appear as cracks in the wallboard, which are repaired by constructing finished wallboard joints.

A wallboard joint is constructed, by applying a joint compound reinforced with a reinforcing tape to fill and cover an open wallboard seam. The joint compound is in the form of a shapeable slurry that fills the seam. The reinforcing tape is applied to extend across the filled seam, and to overlap the edge margins of the wallboard abutting the filled seam.

One form of reinforcing tape is installed, first, by applying a joint compound in a thin layer on the wallboard edge margins. The thin layer is used, before the joint compound dries, to affix the tape onto the wallboard.

Another form of reinforcing tape is an adhesive-backed tape that has a pressure sensitive adhesive that adheres the tape to the edge margins of the wallboard. The adhesive backed tape is porous, in that it has openings through its thickness for passage of the joint compound through the tape, whereby the joint compound can pass through and fill the wallboard seam under the tape.

The wallboard joint is further constructed by applying a thin layer of joint compound to imbed the reinforcing tape and hide the same from view. The edges of the joint compound extend beyond corresponding edges of the reinforcing tape. Further, the edges of the joint compound are tapered or feathered to blend smoothly with the wallboard surface. Thereby, the joint compound hides or camouflages the tape from visual detection as an abrupt bump on the wallboard. After the joint compound has air dried, the surface of the joint compound is lightly sanded to provide a finished wallboard seam with a relatively smooth surface that smoothly blends with the wallboard surface. At least a single layer of joint compound is applied to hide the reinforcing tape, and many times, a second layer is applied, after the first layer has dried, to touch up surface defects in the previous layer. After the joint compound has air dried, a light sanding is performed to further reduce surface roughness, which provides a surface suitable for a prime coat, paint and other surface finishes.

Some wallboard sections are manufactured with tapered edge margins. Thereby, wallboard joints constructed on the tapered edge margins have an effectively lower profile compared to joints constructed onto the flat, major surface areas of the wallboard. However, some wallboard sections have non-tapered edge margins, wherein edge margins are part of the flat, major surface areas of the wallboard. Such wallboard sections benefit from having low profile, wallboard joints that are less prominent than the high profile, wallboard joints constructed on tapered wallboard edges.

A low profile wallboard joint is advantageously reinforced by a low profile tape. The low profile tape must be porous for passage of joint compound to fill a wallboard seam under the tape. However, pores or openings through the tape tend to weaken the tape. To counteract a weakened tensile strength, the tape could be reinforced with reinforcing yarn. The yarn tensile strength of the yarn generally increases with yarn thickness, i.e. the cross sectional thickness. However, it would be desirable to have a yarn that is relatively thin. Then, a wallboard joint that imbeds and hides the tape could be formed with a low profile. However, reducing the yarn thickness would reduce the tensile strength of the yarn. Accordingly, a reduced yarn thickness in a low profile tape must have a tensile strength that adequately reinforces the joint compound.

Further, a reduced yarn thickness is susceptible to pull out from the joint compound. Over the passage of time, thermal cycling and wind load cycling may cause incremental pull out of the yarns from their affixed positions in the joint compound. Thus, a reduced thickness yarn must adequately resist pull out from the joint compound.

Accordingly, there is a need for a low profile reinforcing tape for a joint compound, the tape having both a low profile and multiple openings for passage of a joint compound. Further, the tape must have a tensile strength to reinforce the joint compound. Further, the tape must resist pull out from the joint compound. Further, the reinforcing tape must lie flatly against the wallboard to assume a low profile.

SUMMARY OF THE INVENTION

According to the invention, a reinforcing tape for reinforcing a wallboard joint compound. Advantageously, the reinforcing tape has reinforcing yarns that are interlaced to define openings bounded by the yarns, wherein the openings are for passage of the joint compound. Further, the yarns are adapted with one or more coatings adding tensile strength to the yarns, and adding resistance to pull out of the yarns from the joint compound.

According to another embodiment of the invention, the reinforcing tape has reinforcing yarns that have a tensile strength coating and an adhesive functional coating resisting pull out from a joint compound that imbeds the reinforcing tape.

According to still another embodiment of the invention, the reinforcing yarns are adapted with a coating of styrene-butadiene polymer or copolymer in which the styrene concentration is selected to adjust the suppleness of the tape for lying flatly against a wallboard.

According to a further embodiment of the invention, the yarns have a functional coating of a solvent activated, phase changing adhesive.

According to a further embodiment of the invention, a reinforcing tape for reinforcing a joint compound has a plain weave of, twisted warp yarns and twisted weft yarns, the yarns having yarn counts of, not greater than 33 tex for one, and not greater than 66 tex for the other, the warp yarns and the weft yarns being interchangeable, one to the other, the weave having a thickness of not greater than 0.18 mm.

A preferred embodiment of the invention will now be described by way of example with reference to the accompanying drawings.

DETAILED DESCRIPTION

Figure 1:
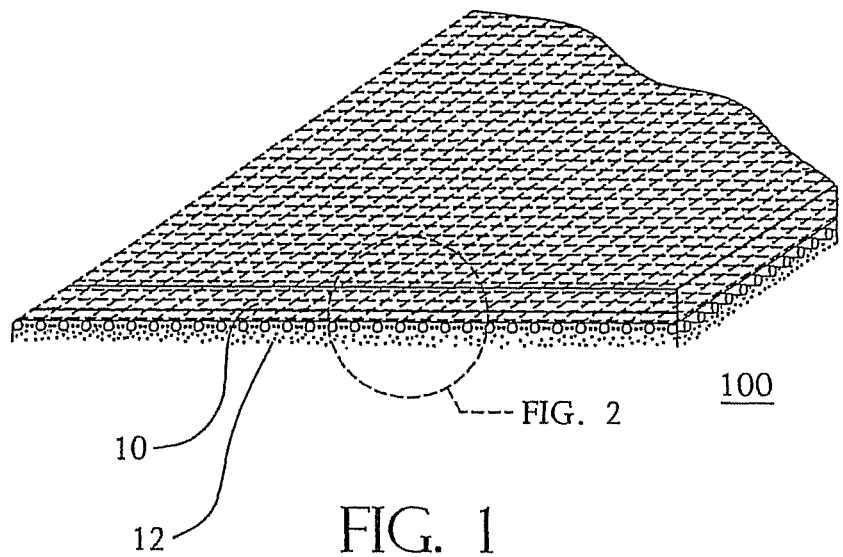
FIG. 1 is a fragmentary isometric view of a reinforcing tape for reinforcing a wallboard joint.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof e.g., "horizontally," "downwardly," "upwardly," etc. should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

According to the invention, FIG. 1 discloses a drywall reinforcing tape 100 that is provided for imbedding in a wallboard joint compound. Advantageously, the tape 100 has reinforcing yarns 10 that are joined together, preferably in an open fabric or scrim, for example, by being interlaced in an open plain weave, to define openings bounded by the yarns 10 for passage of the joint compound. In certain constructions, the yarns 10 are glass fibers bound together using a web adhesive binder 15, such as, vinyl acetate acrylic, styrene/acrylate, vinyl/acetate, acrylic, styrene acrylic, or copolymers and mixtures thereof, etc. In instances where a web adhesive binder 15 is used, it may or may not be re-wettable, soluble or dispersible in water. The yarns 10 can be further adapted with one or more coatings 14 and 16, adding tensile strength to the yarns 10, and adding resistance to pull out of the yarns 10 from the joint compound. The tape 100 is a flexible strip approximately 3 inches wide, which can be rolled up on itself for shipping and handling.

The yarns 10 are monofilament and/or multifilament, strands or fibers, including but not limited to; glass, polyacetal, poly acetate, polyacrylic, polyester, polyolefin, polypropyl, polystyrene, polyvinyl, rayon, polypropylene, nylon, polyvinylchloride, copolymers thereof and combinations thereof.

According to an embodiment of the invention, the reinforcing tape 100 has a plain weave of, twisted warp yarns 10 lengthwise of the tape, and twisted weft yarns 10. The twist is 1.5 turns per inch. The yarns have a yield or weight in grams/km of 33 for the warp yarn and 66 for the weft yarn. A yarn heavier than that would increase the thickness of the fabric in the finished wallboard joint, which would exceed the preferred low profile thickness. Any of the lighter yarns capable of being woven would be advantageous to lessen the thickness of the fabric, and achieve a preferred low profile in the finished wallboard joint. The warp yarns 10 preferably interlace with the weft yarns 10, while the warp yarns 10 are not interlaced with one another. The weft yarns 10 preferably interlace with the warp yarns 10, and are not interlaced with one another. The tape 100 has relatively thin yarns in a weave thickness of not greater than 0.18 mm., which provides the tape 100 with a low profile. Alternatively, the warp yarns and the weft yarns, which includes the respective tex thereof, are interchangeable, one to the other. Further, alternatively, the warp and weft yarns can be laid in a scrim.

The weave has 71.2 ends per 10 cm, and 31.1 picks per 10 cm. Accordingly, the yarn count, or population density of the combined warp and weft yarns 10 is advantageously low to define numerous, generously large openings, bounded by the yarns 10, for ease in passage of the joint compound thereallong. The low count of yarns 10, and their low profile, means that the individual yarns 10 must carry higher pull-out loads than would a higher count of thicker yarns. Accordingly, the tensile strengths of the yarns 10 must be adequate to resist crack formation in the finished drywall joint.

According to the invention, the individual yarns 10 are adapted with an enhanced tensile strength. More particularly, the reinforcing yarns 10 can be coated with a first coating 14 in the form of a penetrating coating of ethylene vinyl acetate, styrene-butadiene polymer, copolymer or the like, to enhance their tensile strengths. The coating 14 of low molecular weight range polymers penetrates the yarns 10, and forms a coating 14 of low thickness, which amounts to a small build up of added yarn thickness. Thereby, each of the yarns 10 retains its low profile. Further, the openings for passage of the joint compound remain generously large, when bounded by the coated yarns 10. The combined yarn 10 and coating 14 have an increased tensile strength compared to the tensile strength of the yarn 10 alone.

When a styrene butadiene polymer is used, the styrene concentration is selected in a range of, about 50% to less than about 60%, to adjust the suppleness of the polymer and the suppleness of the tape 100. The tape suppleness is determined by the suppleness of the polymer coating and the flexibility of the coated yarns 10. The tape suppleness adapts the tape 100 for assuming a low profile by lying flatly against a wallboard. The styrene concentration is preferably less than about 60%. Decreasing the styrene concentration is decreased relative to butadiene concentration, which decreases the stiffness of the tape 100, and increases tape and yarn suppleness.

More preferably the styrene concentration is about 60%, which adapts the tape 100 with handwork pliability, as well as, the aforementioned suppleness. The handwork pliability is advantageous to ease the exertion required to unroll and straighten a length of the tape by handwork, and to press the tape 100 by further handwork into conformal contact flatly with the wallboard. Thus, increasing the styrene concentration further adjusts the handwork pliability of the tape 100.

Figure 2:
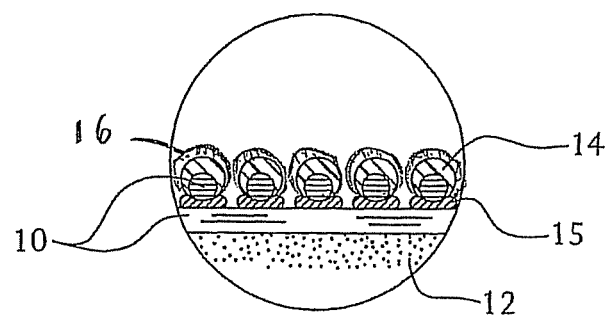
FIG. 2 is a fragmentary enlarged view of a portion of FIG. 1.

The yarns 10 can also have a coating 16 in the form of a solvent activated, phase changing adhesive, for example, ethylene vinyl acetate, EVA, copolymer. In FIG. 2, the adhesive coating 16 is a second coating on the first coating 14. Most preferably, the adhesive coating 16 is a first coating on the yarns 10, and the coating 14 is not employed. The adhesive then acts to penetrate the yarns 10 to enhance the tensile strength of the yarns and the tape 100, as well as to help join or bond to the solidified joint compound with either a chemical or adhesive bond. The adhesive coating 16 is activated to a tacky adhesive state when a solidifiable joint compound is applied to imbed the tape 100. The solvent content of the solidifiable joint compound wets the tape 100 to activate the adhesive coating 16. The solvent content of the solidifiable joint compound is advantageously water. The adhesive coating 16 changes to a liquid phase while in contact with the solidifiable joint compound. Thereafter, by drying the joint compound and the adhesive, the adhesive changes to a solid phase by solidifying together with the joint compound. The adhesive changes to a solid phase, thereby adhering the yarns 10 to the solidified joint compound, which resists pull out of the yarns 10.

To adhere the tape 100 to the wallboard, a rear facing surface of the tape has a third coating 12 in the form of a pressure sensitive adhesive, for example, a water based acrylic glue. Advantageously, the adhesive is in a permanent tacky state, and can be covered by a peel away film of paper or other disposable film, not shown.

Figure 3:
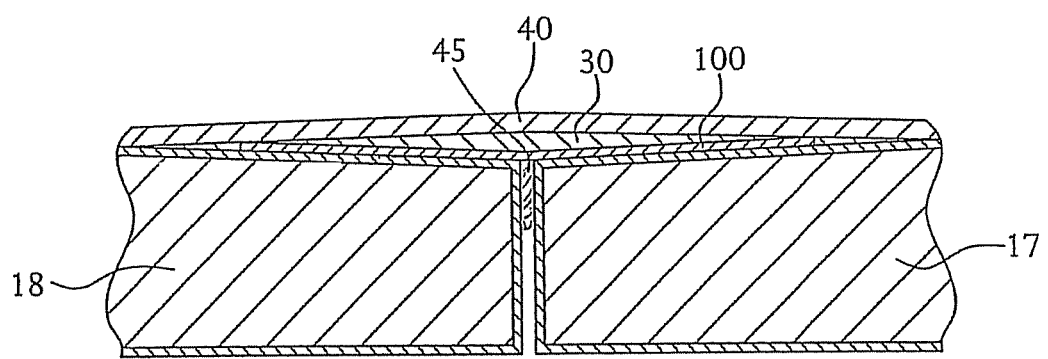
FIG. 3 is an enlarged section view of a portion of a finished wallboard joint.

FIG. 3 discloses that the adhesive coating 12 adheres the tape 100 flatly against the wallboard formed by adjacent sections 17 and 18 to cover an open wallboard seam 45 between the wallboard sections 17 and 18. The open seam 45 behind the tape 100 is filled with a solidifiable joint compound that is applied, by passage of the joint compound through the openings of the tape 100. Thereafter a finished wallboard joint is formed to imbed and hide the tape 100. The finished wallboard joint is constructed with a first coat 30 of the joint compound with feathered edges. If necessary, an optional second coat 40 of the joint compound is applied to cover flaws in the first coat 30.

According to a further embodiment of the invention, a water vapor repelling wax is mixed with the phase change functional coating 16, or is an outer film at an outer surface on the low profile tape 100, serving as a blocking agent, which prevents the tape 100 from becoming tacky in a humid atmosphere.

Table I discloses the features of a low profile tape 100, which are tested in a finished wallboard joint, for tensile strength, resistance to pull out and load withstood until a crack is observed. Prior art tapes in Table I have features that are less favorable than the low profile tape. One form of prior art tape is made with a leno weave. A leno weave is made by a pair of warp yarns crossing opposite sides of a weft yarn, followed by the pair crossing each other before crossing opposite sides of another weft yarn. A leno weave is thicker than a simple weave of low profile, and compares less favorably than the simple weave in Table I. A knitted weave, scrim and a mat, each are thicker than either a simple weave or a leno weave, and thus, are absent from Table I for being less favorable than the low profile tape.

Further, in Table I, the coated weight includes a coating of styrene-butadiene and a functional coating of solvent activated adhesive. In the low profile tape 100 of the present invention the styrene concentration would be adjusted, i.e., decreased downward from about 60%, to adjust for suppleness, compared to a higher styrene concentration of about 60% in a tape of high yarn count.

Further, in Table I, the tensile strength, measured in Newton-centimeters, is lower for a low yarn count tape 100 compared to a high yarn count tape. However, the tensile strength is greater for the coated yarns of a low profile tape 100 compared to uncoated yarns of the same tape. Further, the tensile strength of the coated yarns of the low profile tape 100 is substantially similar to the tensile strength of the Leno weave yarns. Thus, the lower yarn count advantageously enlarges the openings or passages for the joint compound without substantial sacrifice of tensile strength as compared to the tensile strength of the Leno weave yarns. The load to first crack, measured in kilo-Newtons, is the load that creates a first observed crack in a finished wallboard joint that is reinforced by the corresponding tape having coated yarns. The resistance to pull out of the yarns is increased by the functional coating, which, in turn, raises the load being withstood by the finished wallboard joint.

TABLE 1

Characteristics of Wallboard Joint Tapes

| Tape Features | Low profile Low yarn count | High yarn count | Leno weave |
| --- | --- | --- | --- |
| Warp yarn tex | 33 | 33 | 33 |
| Weft yarn tex | 66 | 66 | 66 |
| Ends/10 cm | 71.2 | 79.1 | 35.8 × 2 |
| Picks/10 cm | 31.1 | 38.7 | 34.3 |
| Griege weight gm/m$^2$ | 46.3 | 52.9 | 47.9 |
| Coated weight gm/m$^2$ | 63.9 | 73.0 | 62.2 |
| Thickness mm | 0.18 | 0.18 | 0.23 |
| Tensile strength N cm | 159 warp 153 weft | 166 warp 193 weft | 139 warp 156 weft |
| Load to first crack KN | 0.66 | 1.0 | 0.5 |

Another embodiment of the invention substitutes untwisted yarn 10, or zero twist yarn, for the weft yarn 10. According to U.S. Pat. No. 5,662,990, zero twist yarn can be woven with a rapier loom, and generally has a greater thickness, to have a tensile strength equal to twisted yarn of lesser thickness. According to the present invention, the zero twist yarn 10 has a lower profile than a twisted yarn 10, because its cross section lies flatter, due to limpness and a lack of twist.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A low profile reinforcing tape for reinforcing joint compound including low profile reinforcing yarns joined together with a web adhesive binder to form an open fabric or scrim having openings for passage of the joint compound, wherein the openings are bounded by the low profile reinforcing yarns, the improvement comprising:
   the low profile reinforcing yarns being arranged in a plain weave of twisted warp yarns and twisted weft yarns; the low profile reinforcing yarns have yarn counts of not greater than 33 tex for one, and not greater than 66 tex for the other; the tex of the warp yarns and the tex of the weft yarns are interchangeable, one to the other; and the plain weave has a thickness of not greater than 0.18 mm;
   the low profile reinforcing yarns being coated with a first coating of a polymer having a suppleness, wherein the polymer suppleness increases suppleness of the tape low profile reinforcing for the tape to assume a low profile by lying flatly;
   the low profile reinforcing yarns being coated with a second coating of an adhesive wettable in water adding tensile strength to the low profile reinforcing yarns and adding resistance to pull out of the low profile reinforcing yarns from the joint compound; and
   a pressure sensitive adhesive on at least a back side of the low profile reinforcing tape.

2. The low profile reinforcing tape of claim 1, wherein the adhesive wettable in water includes ethylene vinyl acetate copolymer.

3. The low profile reinforcing tape of claim 1, wherein the polymer includes vinyl acetate polymer or copolymer and styrene-butadiene polymer or copolymer.

4. The low profile reinforcing tape of claim 1, wherein the polymer includes a coated weight of styrene-butadiene.

5. The low profile reinforcing tape of claim 4, wherein the styrene concentration is adjusted to increase suppleness of the low profile reinforcing tape.

6. The low profile reinforcing tape of claim 1, wherein the adhesive wettable in water includes vinyl acetate acrylic, vinyl/acetate, acrylic copolymer, styrene acrylic, or mixtures thereof.

7. The low profile reinforcing tape of claim 1, wherein the low profile reinforcing yams include zero twist yams.

8. The low profile reinforcing tape of claim 1, further comprising: a water vapor repelling wax at an outer surface of the low profile reinforcing tape, wherein the water vapor repelling wax prevents the low profile reinforcing tape from becoming tacky in a humid atmosphere.

* * * * *

UNITED STATES PATENT AND TRADEMARK OFFICE
CERTIFICATE OF CORRECTION

PATENT NO. : 8,828,537 B2  
APPLICATION NO. : 12/339715  
DATED : September 9, 2014  
INVENTOR(S) : Mark J. Newton et al.

Page 1 of 1

It is certified that error appears in the above-identified patent and that said Letters Patent is hereby corrected as shown below:

In The Claims

Column 6, line 52-53, please delete "low profile reinforcing"

Column 6, line 63, please delete "adhesivewettable" and insert --adhesive wettable--

Signed and Sealed this
Fifteenth Day of March, 2016

Michelle K. Lee
*Director of the United States Patent and Trademark Office*